Nov. 18, 1958   R. M. KRULL   2,860,371
FISH CLEANING DEVICE
Filed March 19, 1956
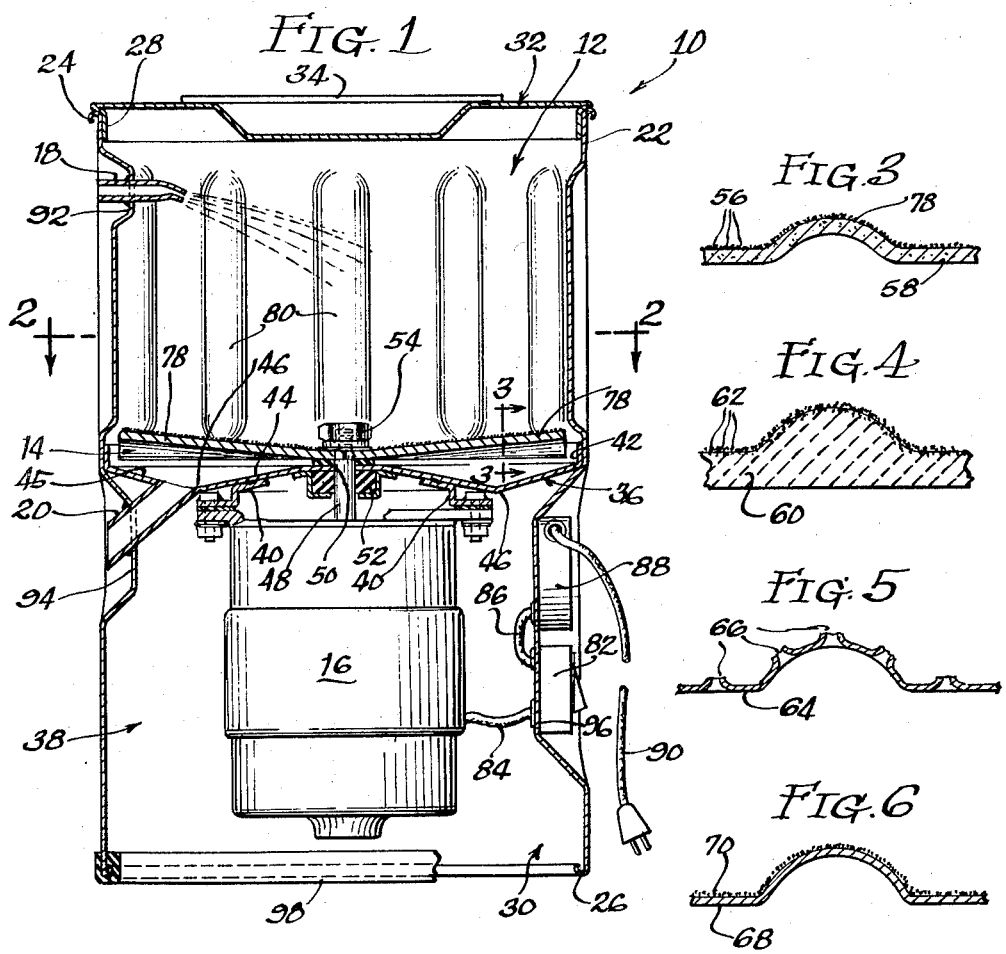
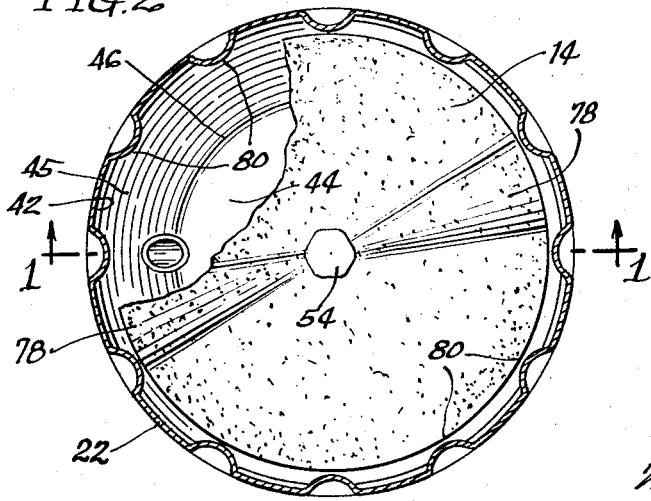
INVENTOR.
Ruth M. Krull
BY Coons, McDougall, Williams & Hersh
Attorneys

2,860,371
FISH CLEANING DEVICE
Ruth M. Krull, Tomahawk, Wis.

Application March 19, 1956, Serial No. 572,300

2 Claims. (Cl. 17—5)

This invention relates to devices for removing scales, slime and the like from fish.

One object of the present invention is to provide a new and improved machine for removing scales from fish by automatic action, without manual effort.

A further object is to provide such a new and improved fish scaling machine which is entirely power driven.

It is another object to provide a new and improved machine that will remove scales from fish in a complete and efficient manner and will wash the fish clean of all scales and slime.

It is a further object to provide a machine that will remove all of the scales from a large batch of fish in an extremely short time.

Another object is to provide such a new and improved fish scaling machine that is convenient in operation yet low in cost.

Further objects and advantages of the present invention will appear from the following description, taken with the accompanying drawings, in which:

Fig. 1 is a central vertical sectional view taken longitudinally through a fish scaling machine which will be described as an illustrative embodiment of the invention, the view being taken generally along a line 1—1 in Fig. 2.

Fig. 2 is a horizontal sectional view with parts broken away, taken generally along a line 2—2 in Fig. 1.

Fig. 3 is a fragmentary enlarged vertical sectional view taken through a scale-removing rotor employed in the machine of Fig. 1, the view being taken generally along a line 3—3 in Fig. 1.

Figs. 4, 5, 6 and 7 are views similar to Fig. 3 showing modified scale-removing rotors.

As already indicated, Figs. 1–3 illustrate a machine 10 for removing scales, slime and the like from fish. In general, the machine 10 comprises a receptacle 12 for receiving the fish. Within the receptacle 12 is a scale-removing rotor 14, adapted to be rotated at a high speed by an electric motor 16. An inlet pipe 18 is provided to introduce water into the upper portion of the receptacle 12 so that the scales, slime and the like will be washed from the fish. A drain pipe 20 extends from the bottom of the receptacle 12 to carry away the water, scales, slime and the like. Both the inlet pipe 18 and the drain pipe 20 are adapted to be connected to hoses or other conduits for carrying water to the receptacle 12 and carrying away the drained waste.

In this instance, the receptacle 12 is formed by a generally cylindrical housing 22 which may be made of galvanized iron, stainless steel, enameled steel, plastics or the like. As illustrated, the housing 22 has beaded upper and lower edges 24 and 26 defining top and bottom openings 28 and 30. The top opening 28 is adapted to be closed by a generally circular cover 32 which is readily removable so that a batch of fish may be dumped into the upper portion of the housing 22. It will be seen that a handle 34 is provided on the cover 32 so that it may be manipulated conveniently.

The generally cylindrical housing 22 is divided into upper and lower compartments by means of a generally circular partition or wall 36. The receptacle 12 constitutes the upper compartment of the housing 22, while the lower compartment is indicated at 38. In this instance, the electric drive motor 16 is mounted within the lower compartment 38. It will be seen that the motor 16 is bolted or otherwise secured to brackets 40 mounted on the underside of the partition 36. As shown, the partition 36 has a peripheral flange 42 which is suitably secured to the inside of the housing 22, approximately midway between the top and bottom thereof.

To insure complete drainage of the waste material from the upper compartment or receptacle 12, the partition 36 is made concave in form. More specifically, the partition 36 is provided with inner and outer downwardly sloping portions 44 and 45 which meet to define an annular, concave, generally trough-like portion 46. The drain pipe 20 is connected to the trough-like portion 46 to insure complete drainage of the partition 36.

It will be seen that the electric motor 16 has a vertical shaft 48 which extends upwardly through an axial opening 50 in the partition or bottom wall 36. A mechanical seal 52 is provided between the partition 36 and the shaft 48 to prevent leakage of water around the shaft. The scale-removing rotor 14 is removably mounted on the upper end of the shaft 48. In this instance, a covered nut 54 is threaded onto the upper end of the shaft 48 to retain the rotor 14 thereon for rotation therewith. In this way, the rotor 14 is readily removable to facilitate thorough cleaning of the rotor and the receptacle 12.

The scale-removing rotor 14 is provided with a plurality of rough upper surface elements for removing the scales from the fish by abrasion. As illustrated by way of example in Figs. 3–7, the rough surface elements may assume a variety of forms. Thus, Fig. 3 shows the rough surface elements as sharp abrasive grains 56 projecting upwardly from a resin bonded abrasive body 58. In Fig. 4, the scale-removing rotor is shown with a ceramic abrasive body 60 having sharp, coarse abrasive grains 62 projecting upwardly on its upper surface.

As illustrated in Fig. 5, the scale-removing rotor has a body 64 made of sheet metal which is perforated and flared or drawn upwardly to form a plurality of sharp, rough annular edges 66. These edges remove the scales from the fish by abrasive or scraping action.

In Fig. 6, the scale-removing rotor is again shown with a sheet metal body 68, but the rough upper surface elements are provided by a granular, abrasive coating 70 applied to the upper surface of the body.

As shown in Fig. 7, the scale-removing rotor has an expanded sheet metal body 72 having a large number of sharp, upwardly projecting edges 74 with slits or openings 76 therebetween. The edges 74 are adapted to scrape or abrade the fish so as to remove the scales and slime.

In each of the forms of the scale-removing rotor 14 shown in Figs. 3–7, the rotor is arranged so as to cause tumbling action in the batch of fish. In this way, all of the fish will be brought into contact with the roughened upper surface of the rotor. In this instance, the tumbling action is induced by a plurality of angularly spaced, generally radial, upwardly projecting ridges or convolutions 78 formed in the rotor 14. These ridges or vanes agitate the mass of fish as the rotor is driven at high speed. It has been found sufficient to provide only two of the ridges 78, although a greater number may be provided if desired.

The tumbling and agitating action of the rotor 14 is enhanced and supplemented by providing a plurality of convolutions 80 in the wall of the receptacle 12. More specifically, the illustrated convolutions 80 are formed longitudinally in the upper portion of the housing 22 and are spaced angularly around the receptacle 12.

In the illustrated machine 10, the drive motor 16 is controlled by means of a combined switch and timer 82 mounted on the lower portion of the housing 22. The timer 82 is arranged to shut off the motor 16 after a predetermined interval of operation. It will be seen that an electric cord 84 extends between the motor 16 and the timer 82. A second cord 86 extends between the timer and a cord reel 88, which is adapted to hold an extension cord 90 for connecting the machine to an ordinary electric receptacle. In this way, electric power is supplied to the machine.

It will be seen that the inlet and outlet pipes 18 are mounted on recessed portions 92 and 94 of the housing wall 22. Likewise, the timer 82 and the cord reel 88 are mounted on a recessed portion 96. In this way, the timer 82, the cord reel 88, and the pipes 18 and 20 are mounted flush with the outer surface of the housing 22, to protect these elements from damage and to facilitate shipment and handling of the machine. The lower edge 26 of the housing 22 is fitted with a protective ring 98 made of rubber or the like and adapted to prevent the machine from slipping along the floor or other supporting surface. In addition the ring 98 prevents the housing 22 from scratching the floor.

In operation, the electric cord 90 is connected to a suitable source of electric power. For use on shore, the electric cord may be connected to an ordinary household electric receptacle. The fish scaling machine may also be used on board a suitable boat, in which case the electric cord may be connected to the generator or other source of electric power on the boat. It will be understood that various types of electric motors may be employed in the fish scaling machine to operate on the various types of electric current available on board a boat or on shore. Thus, the motor 16 may be adapted to operate on alternating current at 110 volts, direct current at 12 volts, or any other type of available electric power. Moreover, the electric motor may be replaced with a gasoline engine or the like in the event that suitable electric power is not available, as might be the case on board certain boats.

The inlet pipe 18 is connected to a suitable source of running water. On shore the source might be a city water main or a private water supply system, for example. When the fish scaling machine is used on board a boat, the source of water may be a pump adapted to discharge water into the inlet pipe 18. The pump may take the water from the ocean, river or lake on which the boat is located. It will be understood that the fish scaling machine will operate equally well on either salt or fresh water.

A drain hose may be connected to the drain pipe to carry away the drained waste. On board a boat, the drain hose may be arranged to discharge into the body of water on which the boat is located. On shore, the hose may be arranged to discharge the waste into a body of water, onto the ground, or into any suitable drain conduit, as desired. In some cases, the drain hose may be dispensed with and the waste may simply be allowed to drain into a receptacle or onto the ground.

With the cover 32 removed, a batch of fish is placed in the receptacle 12. The batch may contain a large number of fish. Next, the cover is replaced and the flow of water is started. The timer switch 82 is actuated to start the drive motor 16, so that the rotor or plate 14 will be rotated at high speed. The rough upper surface of the rotor 14 abrades and scrapes the scales and slime from the fish. It will be understood that the stream of water from the inlet pipe 18 washes the scales and slime off the fish and into the drain pipe 20.

As the rotor 14 is rotated by the drive motor, the fish are tumbled by the agitating action of the ridges or vanes 78 on the rotor. In this regard, the ridges or vanes 78 act in cooperation with the corrugations or ridges 80 on the wall of the receptacle 12. The tumbling action brings all of the fish into contact with the rotor or plate 14. After a short time, all of the scales are removed from the fish. The timer 82 stops the motor 16 automatically after a predetermined interval to prevent unnecessary abrasive action on the fish.

It will be understood that the size of the fish scaling machine may be varied to accommodate fish of various sizes. For example, the machine may be proportioned to remove the scales and slime from large ocean fish, such as tuna, for instance. In that case, the machine may be five or six feet in diameter or even larger. On the other hand, the machine may be proportioned to remove the scales and slime from small pan fish of the type commonly caught in fresh water lakes and streams. For such use, the machine may be about 15 inches in diameter or even smaller. With such a machine, it has been found that all of the scales and slime can be removed in about ninety seconds in a typical batch of approximately fifteen pan fish of assorted sizes. Of course, a wide variety of sizes of fish can be handled in a machine of any given size. Whatever the size of the machine, the fish are scaled very quickly and efficiently, without manual effort other than the slight effort involved in getting the fish into and out of the machine. Moreover, the machine completely eliminates all of the messiness usually associated with manual scaling. All of the scales and slime are washed completely from the fish and into the drain pipe.

The coarseness and construction of the abrasive plate or rotor may be varied in accordance with the size and type of fish to be scaled. For ocean fish with large scales, a coarse abrasive surface is employed on the rotor. For removing smaller scales, the abrasive surface of the rotor may be made finer in texture.

When employed on an ocean-going or other boat, the fish scaling machine may also serve very advantageously as a tank for live bait. Thus, when the boat is outbound, the outlet pipe 20 is closed off by placing a plug therein. Alternatively, a valve may be installed in the outlet pipe so that it may be closed or opened as desired. The rotor or abrasive plate may be removed from the machine when it is to serve as a bait tank. However, the rotor may be left in place if desired. The receptacle 12 of the machine is then filled partly or completely with water, either salt or fresh, according to the type of bait. Small fish or other live bait are then placed in the receptacle. After a load of fish has been caught, the fish scaling machine is drained by opening the drain pipe 20. Any unused live bait may be transferred to another receptacle or discarded. The scaling rotor is then mounted in the machine, whereupon it may be employed immediately for scaling the fish.

Employing the machine as a combination bait tank and fish scaler brings about a great saving in space on the boat. In effect, the scaling machine requires no extra space, because it may be employed as a bait tank, which would be necessary in any case.

All of the fish may be scaled with the machine while the boat is inbound. The scaled fish are immediately packed in ice or otherwise refrigerated or frozen. Removing the scales and slime from the fish before they are refrigerated or frozen assists greatly in preserving the fish, because much of the deterioration and spoilage in unscaled fish takes place in or originates from the scales and slime. With the scales and slime removed, the fish may be preserved much more effectively and will have a better flavor and odor.

The machine largely cleans itself by the action of the rotor and the stream of water. If further cleaning is desired, the rotor may easily be removed so that the entire rotor and receptacle will be accessible.

The entire machine may be made at extremely low cost, yet is effective and dependable. Use of the machine maintains a high standard of cleanliness and helps to preserve the fish.

Various modifications, alternative constructions and equivalents may be employed without departing from the true spirit and scope of the invention as exemplified in the foregoing description and defined in the following claims:

I claim:

1. In a device for scaling fish, the combination comprising a generally cylindrical housing having an open top, a cover removably received on said housing for closing the top thereof, a wall extending transversely across said housing at a point between the top and bottom thereof and dividing said housing into upper and lower compartments, said housing having a plurality of longitudinal corrugations therein spaced around said upper compartment, an electric motor mounted in said lower compartment and having a vertical shaft extending through said wall into said upper compartment, a scaling plate mounted on said shaft and rotatable therewith adjacent said wall in said upper compartment, said plate having a plurality of angularly spaced upwardly projecting generally radial ridges thereon for causing tumbling action in fish contained in said upper compartment, said plate being provided with a multitude of small sharp projections on the upper side thereof for removing the scales from the fish, an inlet pipe extending through said housing adjacent the upper end thereof for introducing water into said upper compartment, and a drain pipe leading from said upper compartment and extending downwardly from said wall for carrying away the water and scales and other waste products from said fish, said wall having inner and outer downwardly sloping portions meeting in an annular concave trough-like portion, said drain pipe being connected to said concave portion to insure complete drainage of said upper compartment.

2. In a device for scaling fish, the combination comprising a generally cylindrical housing having an open top, a cover removably received on said housing for closing the top thereof, a wall extending transversely across said housing at a point between the top and bottom thereof and dividing said housing into upper and lower compartments, said housing having a plurality of longitudinal corrugations therein spaced around said upper compartment, an electric motor mounted in said lower compartment and having a vertical shaft extending through said wall into said upper compartment, sealing means between said wall and said shaft, a scaling plate mounted on said shaft and rotatable therewith adjacent said wall in said upper compartment, said plate having a plurality of angularly spaced upwardly projecting generally radial ridges thereon for causing tumbling action in fish contained in said upper compartment, said plate being provided with a multitude of small sharp projections on the upper side thereof for removing the scales from the fish by abrasion, an inlet pipe extending through said housing adjacent the upper end thereof for introducing water into said upper compartment, a drain pipe leading from said upper compartment and extending downwardly from said wall for carrying away the water and scales and other waste products from said fish, said wall having inner and outer downwardly sloping portions meeting in an annular concave trough-like portion, said drain pipe being connected to said concave portion to insure complete drainage of said upper compartment, and means connected to said motor and including a timer for energizing said motor for an interval and then stopping said motor.

References Cited in the file of this patent

UNITED STATES PATENTS

| | | |
|---|---|---|
| 71,434 | White | Nov. 26, 1867 |
| 942,932 | Robinson | Dec. 14, 1909 |
| 2,117,765 | Johnston | May 17, 1938 |
| 2,262,383 | Carlson | Nov. 11, 1941 |
| 2,299,020 | Jones | Oct. 13, 1942 |
| 2,514,493 | Hetherington | July 11, 1950 |